Aug. 14, 1951     H. TERWILLIGER     2,564,513
FISH NET SUPPORT
Filed June 23, 1947     2 Sheets-Sheet 1
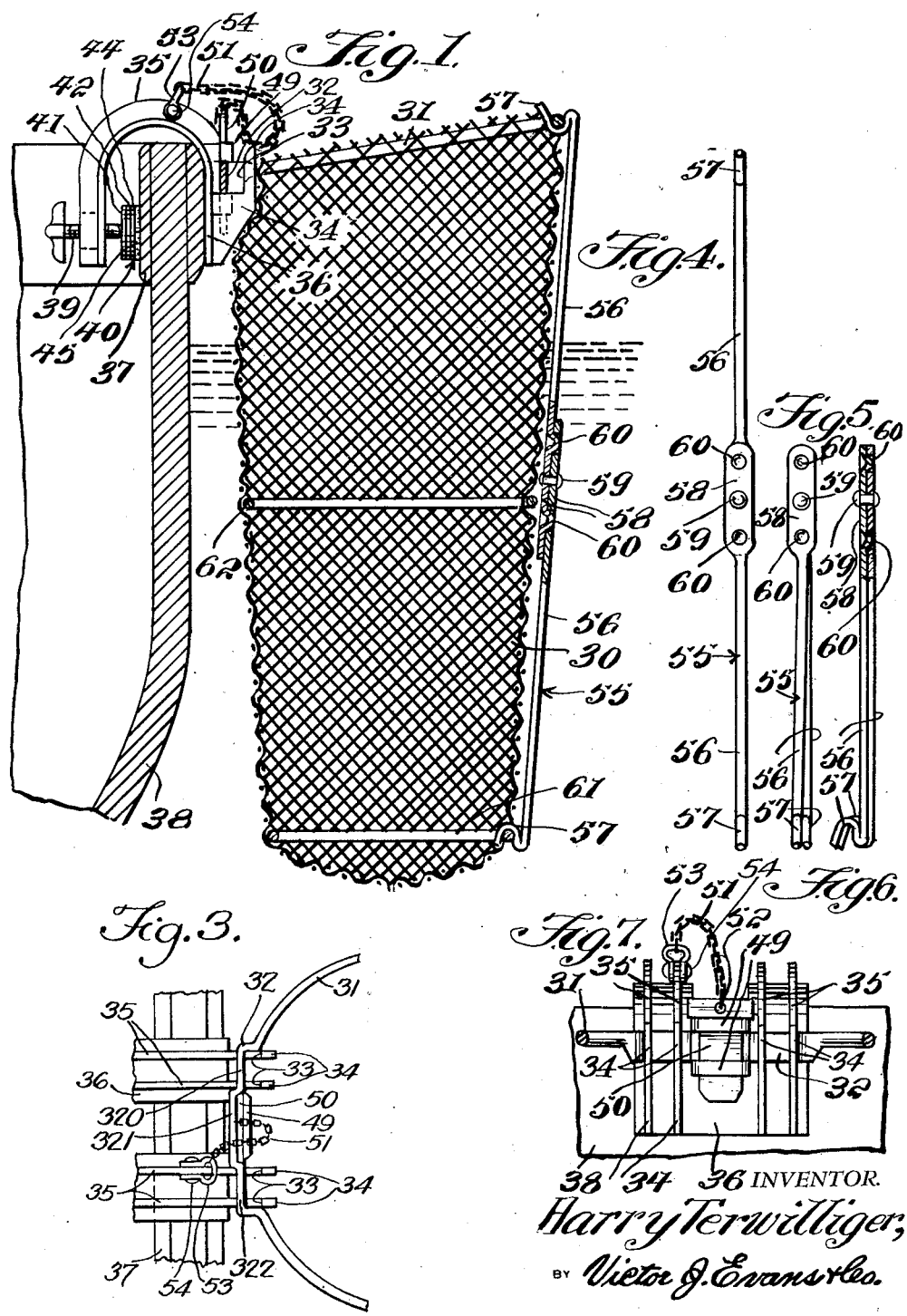
INVENTOR.
Harry Terwilliger,
BY Victor J. Evans & Co.
ATTORNEYS Aug. 14, 1951 — H. TERWILLIGER — 2,564,513
FISH NET SUPPORT
Filed June 23, 1947 — 2 Sheets-Sheet 2
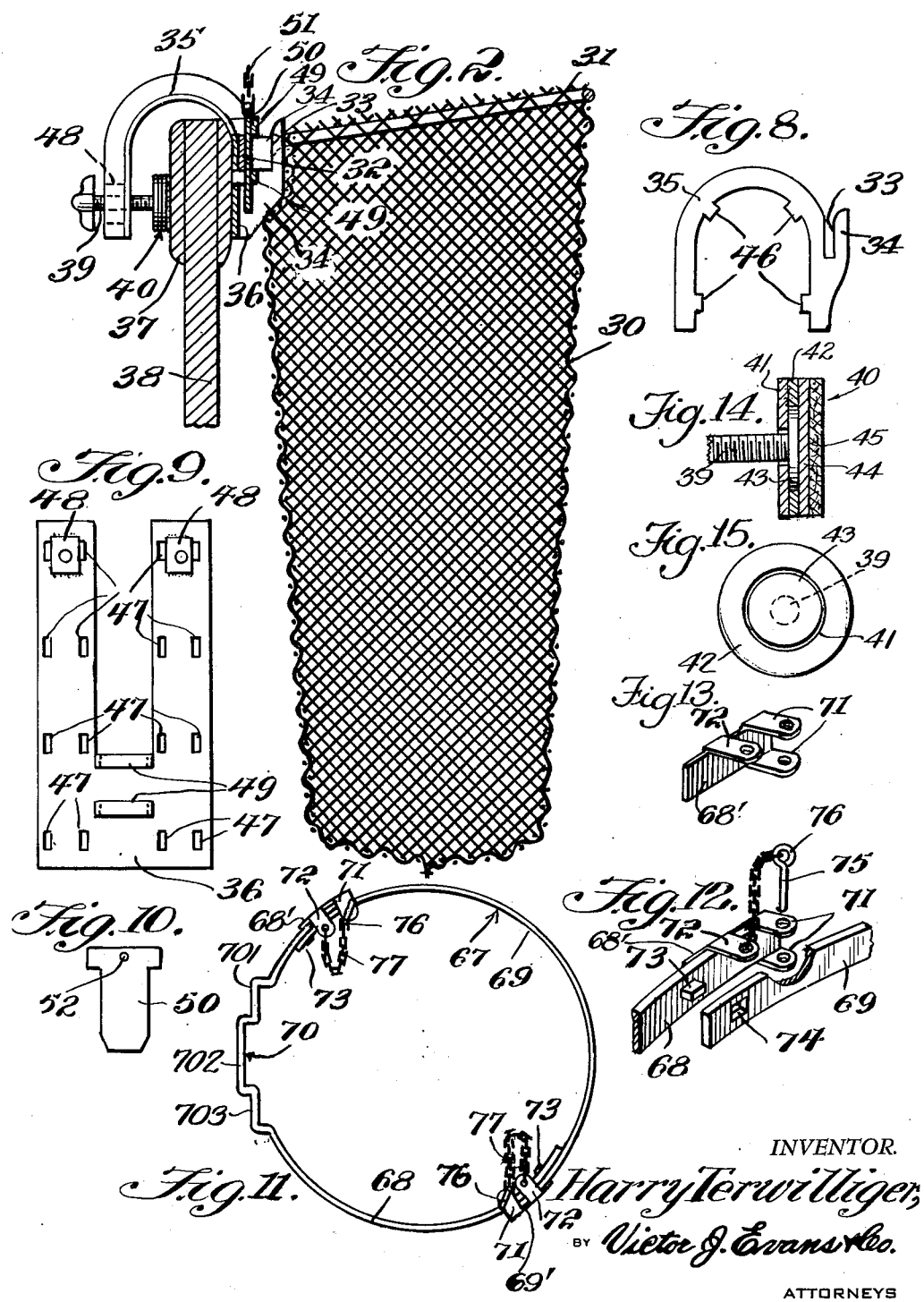
INVENTOR.
Harry Terwilliger
BY Victor J. Evans & Co.
ATTORNEYS Patented Aug. 14, 1951

2,564,513

UNITED STATES PATENT OFFICE 2,564,513

FISH NET SUPPORT

Harry Terwilliger, Weidman, Mich.

Application June 23, 1947, Serial No. 756,428

1 Claim. (Cl. 43—55)

This invention relates to a fish saver which is especially designed to retain fish after they have been caught, by hanging the saver on a suitable support so that the fish can be submerged in their native water and kept alive until the fisherman desires to leave for home or camp.

Another object of the invention is to provide a device that is easily packed and transported in luggage or fish box.

With the above and other objects and advantages in view, the invention consists of the novel details of construction, arrangement and combination of parts more fully hereinafter described, claimed and illustrated in the accompanying drawings in which:

Figure 1 shows an embodiment of the invention as attached to the gunwale of a boat, with the hoops and stretcher in use;

Figure 2 is the same, without the hoops and stretcher;

Figure 3 is a partial top plan view of Figure 2;

Figure 4 is an elevational view of the stretcher in extended position;

Figure 5 is the same, with the stretcher in folded position;

Figure 6 is a side view partly in section of the stretcher in folded position;

Figure 7 is a front elevational view of the outer side of the supporting clamp with the ring support broken away;

Figure 8 is an elevational view of a modified form of clamp;

Figure 9 is a plan view of the base to be used with the clamp shown in Figure 8;

Figure 10 is a plan view of the locking wedge;

Figure 11 is a modified form of hoop;

Figure 12 is a perspective view of the connection of the hoop sections shown in Figure 11;

Figure 13 is a perspective view of one end of the hoop sections shown in Figure 12;

Figure 14 is a detailed sectional view of a swivel connection for the net; and

Figure 15 is a front view of the swivel shown in Figure 14.

Referring more in detail to the drawings, the numeral 30 will designate the net embodying the invention in all views. This net has an open top and a closed bottom, and if submerged in water, will permit the water to circulate through the net to preserve any fish placed therein.

The net is attached at its open end to a hoop 31 having a flattened rear portion 32 which consists of parallel sections 320, 321 and 322 respectively, and sections 320 and 322 respectively which are adapted to be received in the slot 33 formed in each keeper 34, which are arranged in pairs in parallel relation to each other on the U-shaped portions 35 of the bracket plate 36 which engages the inside of the gunwale 37 of the boat 38, and the portions 35 extending over the top of the gunwale are provided with winged clamping screws 39 that are loosely mounted at one end in the swivel pressure means 40 which comprises a centrally apertured washer 41 to which is welded a centrally apertured washer 42, the aperture of which is large enough to loosely engage the washer 43 welded to the end of the screw 39. Engaging the washer 43 loosely and welded to the washer 42 is a disc 44, on which is secured by a suitable means, a disc pad 45 which engages the inner side of the gunwale 37 when the screw 39 is tightened, to hold the bracket on the boat. The portions 35 may be arranged with inwardly directed studs 46 as shown in Figure 8 to engage in the slots 47 which are arranged in pairs to receive the pairs of portions 35 as previously described, and nuts 48 are welded to the lower ends of the portions 35 to carry the screws 39.

The slots 33 are of sufficient width to receive the portion 32 of the hoop 31 in the slots 33, intermediate of the keeper 34 and the parallel loops 49 struck out from the plate 36. The portion 32 is then inserted between the loops 49 which receive the key 50 and the key 50 passing in front of the portion 32, retains this portion in position. A chain 51 attached to the aperture 52 in the key and to the loop 53 pivotally mounted at 54 on one of the portions 35, prevents loss of the key.

To retain the net 30 in extended position, and to prevent collapse thereof, a stretcher 55, as shown in Figures 4, 5 and 6, is used. The stretcher comprises two similar shaped sections 56 having hooks 57 formed at their outer ends and flat portions 58 at their inner ends which are pivotally connected by a pin 59 and conforming openings and indentures 60 formed in the portions 58 on opposite sides of the pin 59 coact to keep the stretcher in extended position, as shown in Figure 4, and in this position, the hooked ends 57 will engage the hoop 31 and a hoop 61, which is secured to the lower end of the net. An intermediate hoop 62 in the center of the net 30 prevents the net from collapsing at this point.

Figures 11 to 13 inclusive show a modified form including hoop 67 which is made of sections 68 and 69 respectively, and section 68 carries the flat portion 70 which consists of parallel sections 701, 702 and 703 respectively. Secured to one end of the sections 68 and 69 respectively are the short plates 68' and 69' respectively which are provided along their longitudinal edges with the opposed apertured ears 71 and an apertured ear 72 inwardly of the ears 71, and a lug 73, is formed on each section 68 and 69, inwardly of the ear 72. The mating ends of the sections are each provided with an opening 74 to receive the lug 73, and a pin 75 is placed in the ears 71 to retain the sections in position. An eye 76 on each pin has a chain 77 connected thereto and to the ear 72, to prevent loss of the pin 75. The opposite ends of the sections 68 and 69 have the same structure as described, except that the arrangement is reversed. The plate with the ears and lug are on the section 69 and the opening 74 on the section 68.

There has thus been provided a fish net support which will accomplish the objects of the invention, and it is believed that from the foregoing description, the construction and operation of the invention will be apparent to those skilled in the art.

It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a device for supporting a net of the type having a hoop for maintaining the net in open position, said hoop having a portion thereof consisting of parallel sections in spaced relation, two of the sections being at the end of a third section and connected thereto, a bracket for securing the hoop to a support, said bracket having U-shaped portions, one of the legs of each U-shaped portion having a clamp extending therethrough, the remaining leg having a wall cooperating with said clamp to maintain the bracket on the support, said remaining leg having one or more notches therein to receive the end sections of the hoop, said bracket having a pair of loops, one adapted to be located above and the other below said hoop when the end sections are within the notches, and a key adapted to lock the hoop in the bracket, said key adapted to be positioned between some of the parallel sections and within the loops.

HARRY TERWILLIGER.

REFERENCES CITED

The following references are of record in the file of this patent:

UNITED STATES PATENTS

| Number | Name | Date |
| --- | --- | --- |
| 1,007,758 | White | Nov. 7, 1911 |
| 1,445,763 | Gibbs et al. | Feb. 20, 1923 |
| 1,532,367 | Bockman | Apr. 7, 1925 |
| 1,985,177 | Lawrence | Dec. 18, 1934 |

FOREIGN PATENTS

| Number | Country | Date |
| --- | --- | --- |
| 423,907 | Germany | Jan. 12, 1926 |